United States Patent [19]

Sugiyama

[11] Patent Number: 4,905,943

[45] Date of Patent: Mar. 6, 1990

[54] APPARATUS FOR FIXING THE PIPING IN A CONCENTRATED MANNER

[75] Inventor: Kenji Sugiyama, Numazu, Japan

[73] Assignee: Usui Kokusai Sangyo Kaisha Ltd., Sunto, Japan

[21] Appl. No.: 291,526

[22] Filed: Dec. 29, 1988

[30] Foreign Application Priority Data

Jan. 9, 1988 [JP] Japan .............. 63-1378[U]

[51] Int. Cl.⁴ ............................................. F16L 3/22
[52] U.S. Cl. .................................. 248/68.1; 138/106
[58] Field of Search ............ 248/49, 65, 68.1, 71, 248/74.1, 309.1, 316.1, 500; 138/106; 174/72 R

[56] References Cited

U.S. PATENT DOCUMENTS

| 1,424,658 | 8/1922 | Lidstone | 138/107 |
|---|---|---|---|
| 2,896,887 | 7/1959 | Beltz | 248/68.1 |
| 3,034,185 | 5/1962 | Olsen | 248/65 |
| 3,432,128 | 3/1969 | Elleboudt | 248/68.1 |
| 4,108,408 | 8/1978 | Butti | 248/68.1 |
| 4,214,723 | 7/1980 | Voorhees | 248/68.1 |
| 4,253,629 | 3/1981 | Wilmes | 248/68.1 |
| 4,421,975 | 12/1983 | Stein | 248/68.1 |
| 4,433,821 | 2/1984 | Bolding | 248/65 |
| 4,781,255 | 11/1988 | Lock | 248/68.1 |

FOREIGN PATENT DOCUMENTS

| 1149153 | 5/1963 | Fed. Rep. of Germany | 248/68.1 |
|---|---|---|---|
| 1065759 | 5/1954 | France | 174/72 |
| 17997 | 2/1978 | Japan | 248/65 |
| 598363 | 2/1948 | United Kingdom | 248/65 |
| 1309808 | 3/1973 | United Kingdom | 248/49 |
| 2173275 | 10/1986 | United Kingdom | 248/49 |

Primary Examiner—Ramon O. Ramirez
Assistant Examiner—Robert A. Olson
Attorney, Agent, or Firm—Anthony J. Casella; Gerald E. Hespos

[57] ABSTRACT

Disclosed is an apparatus for fixing the piping by the use of a clamp member. Pipes, such as metal pipes or resin tubes, each having a bent portion are retained between opposing clamping walls of a clamp member formed into a U-shape using a sheet material and having an installation wall for installation on a base. The installation wall is provided in such a manner as to extend from one end of the clamp member. The pipes are arranged wuch a manner that their bent portions are juxtaposed within a plane in a concentrated manner. Retaining claw walls for retaining the respective pipes are provided at an upper end opening of the clamp member between the clamping walls in such a manner as to extend from either of the clamping walls perpendicularly of the clamping walls. The apparatus permits the use of the plated piping and clamp through the disuse of a soldering operation at the time of assembly and facilitates assembly.

9 Claims, 1 Drawing Sheet

APPARATUS FOR FIXING THE PIPING IN A CONCENTRATED MANNER

BACKGROUND OF THE INVENTION

1. Field of the Invention

The present invention relates to improvements on an apparatus for fixing the piping in a concentrated manner by means of a clamp member which is installed on a base of an automobile or various types of machines and equipment at the time when metal pipes or resin tubes (hereafter simply referred to as the piping) having relatively small diameters of about 20 mm or less and provided with bent portions are installed as passages for supplying oil, a gas, or the like.

2. Description of the Prior Art

Conventionally, a known apparatus of this type for fixing the piping in a concentrated manner is arranged such that, in the case of, for instance, metal piped, the collected pipes are fixed to a clamp having various shapes by means of soldering, and, in the case of resin tubes, the straight portions of the tubes are collected, engaged with each other in the form of a bundle and secured.

However, with the above-described conventional fixing structures, the following problems are encountered: In the case of the former structure, since heating and soldering are necessary, it is impossible to use the plated piping. Accordingly, not only the piping but the clamp must be provided with plating after heating and soldering. Furthermore, the assembly operation involves complicated procedures, thereby deteriorating productivity by a substantial degree. Additionally, there has been the problem that, in connection with local heating, a deterioration in the mechanical strength against cracking and breakage can occur in assembly portions of the piping. Meanwhile, in the case of the latter structure, due to the structure of engagement in the form of a bundle at the straight tube portions, a "collapse" is liable to occur, causing a hindrance to the circulation of a fluid flowing through the interior thereof. At the same time, a "positional deviation" in the axial or circumferential direction of the tubes can occur in the engaging portions due to vibrations or the like, thereby causing a malfunctioning.

SUMMARY OF THE INVENTION

Accordingly, an object of the present invention is to provide a fixing apparatus which permits the use of the plated piping and clamp through the disuse of a soldering operation at the time of assembly, eliminates the possibility of a deterioration in the mechanical strength of assembly portions caused by heating, eliminates the possibility of such trouble as the above-described "collapse" and "positional deviation" during or after assembly, and facilitates fixing in a concentrated manner by means of a clamp member, thereby overcoming the above-described drawbacks of the prior art.

To this end, according to the present invention there is provided an apparatus for fixing the piping by the use of a clamp member, characterized in that pipes, such as metal pipes or resin tubes, each having a bent portion are retained between opposing clamping walls of a clamp member formed into a U-shape using a sheet material and having an installation wall for installation on a base, the installation wall being provided in such a manner as to extend from one end of the clamp member, the pipes being arranged in such a manner that their bent portions are juxtaposed within a plane in a concentrated manner, and retaining claw walls for retaining the respective pipes being provided at an upper end opening of the clamp member between the clamping walls in such a manner as to extend from either of the clamping walls perpendicularly of the clamping walls.

Since the present invention is arranged as described above, as the piping is inserted through the upper end opening between the clamping walls or an opening between the side portions of the clamping walls, the bent portions of the pipes are juxtaposed within a plane and and clamped in a concentrated manner. Furthermore, since the retaining claw walls provided at an end of the clamping wall in such a manner as to project perpendicularly of the clamping wall are adapted to engage with the bent portions of the pipes or thereabouts, the piping can be secured positively without causing any "positional deviation" in the axial or circumferential direction of the pipes. In addition, in connection with the configuration of the clamp member having U-shaped clamping walls formed linearly by stamping, the fabrication of the clamp member and the assembly of the piping can be facilitated by a remarkable degree.

DETAILED DESCRIPTION OF THE PREFERRED EMBODIMENT

Figure 1:
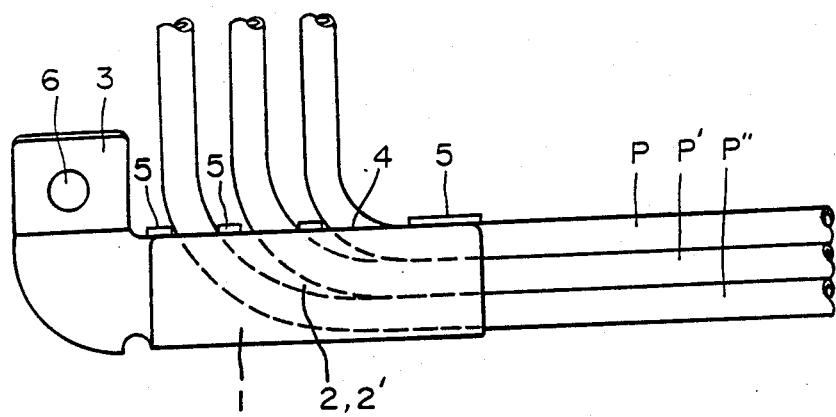
FIG. 1 is a top plan view of an apparatus for fixing the piping in a concentrated manner by the use of a clamp member in accordance with an embodiment of the present invention.
Figure 2:
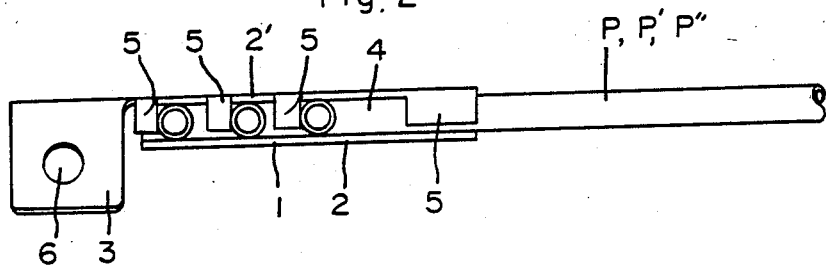
FIG. 2 is a front elevational view of the apparatus shown in FIG. 1.

Referring now to the accompanying drawings, a description will be given of an embodiment of the present invention. In the drawings, a metallic clamp member 1 is formed into a U-shape by stamping a plate material. Opposing wall portions of the U-shaped configuration constitute clamping walls 2, 2'. An installation wall 3 for installation on a base (not shown) is formed in such a manner as to extend from one end of either of the clamping walls 2, 2' and is provided with a bolt hole 6. A plurality of pipes P, P', . . . are respectively provided with bent portions and are secured between the clamping walls 2, 2' in a state in which the pipes are collected with the bent portions juxtaposed within a plane. In addition, the peripheral walls of the pipes P, P', . . . in the vicinity of their bent portions are secured by being clamped or retained by retaining claw walls 5 provided at an upper end opening 4 of the upper clamping wall 2' in such a manner as to project downwardly thereof.

As described above, since the apparatus for fixing the piping in a concentrated manner by the use of a clamp member is arranged such that the pipes P, P', . . . are retained and fixed with their bent portions juxtaposed within a plane between the clamping walls 2, 2' in a concentrated manner, in the case of metallic pipes, a soldering operation during assembly becomes unnecessary, so that the use of the plated piping and clamp member becomes possible. In addition, there is virtually no possibility of a deterioration in the mechanical strength in the vicinity of assembly parts due to heating, and no plating process is required after assembly. In the case of resin tubes, there is virtually no possibility of the occurrence of a "collapse" at the engaging portions or a "positional deviation" caused by vibrations or the like. In addition, the fabrication of the clamp member and the installing and fixing operations of the piping can be facilitated. Thus, in accordance with the present invention, there is provided a very useful apparatus for fixing the piping in a concentrated manner by the use of a clamp member.

What is claimed is:

1. An apparatus for fixing pipes to a base in a concentrated manner, comprising:

a clamp member made of a sheet material formed into a generally U-shape to define top and bottom clamping walls disposed in generally parallel relationship, a rear wall connected to and extending unitarily between the top and bottom walls, a plurality of retaining front claw walls connected unitarily to at least one of said top and bottom walls and extending at least partly therebetween, said front claw walls being spaced from one another to define front openings therebetween, installation means unitary with the clamp member for permitting secure mounting of the clamp member to the base, said clamp member defining at least one open side extending between the top and bottom walls; and a plurality of pipes extending into the open side of the clamp member, each said pipe having a bent portion disposed in a common plane and in secure clamping engagement between the top and bottom clamping walls of the clamp member, said pipes further being clamped intermediate the rear wall and at least one of the claw walls of the clamp member, each said pipe passing through one of said front openings, intermediate a selected pair of said spaced apart claw walls and being in secure engagement with one of said claw walls.

2. An apparatus according to claim 1, wherein said piping is constituted by metallic pipes or resin tubes.

3. An apparatus according to claim 1, wherein said clamp member is formed by stamping.

4. An apparatus according to claim 1, wherein a bolt hole is provided in said installation wall.

5. An apparatus according to claim 1 wherein the installation means comprises an installation wall extending unitarily from the remainder of the clamp member, said installation wall being provided with a mounting aperture extending therethrough.

6. An apparatus as in claim 5 wherein said installation wall extends unitarily from the bottom wall of the clamp member.

7. An apparatus as in claim 6 wherein said top and bottom walls are generally planar, and wherein at least a portion of said installation wall is angularly aligned to said top wall.

8. An apparatus as in claim 7 wherein said front retaining claw walls extend generally perpendicular to the top and bottom clamping walls of the clamp member.

9. An apparatus for fixing pipes to a base in a concentrated manner, said apparatus comprising:

a plurality of pipes, each said pipe having a bent portion, the bent portions of said pipes being disposed to lie substantially in a common plane and in juxtaposed relationship to one another; and a clamp member unitarily formed from a sheet material and comprising parallel top and bottom clamping walls disposed in clamping engagement with the bent portions of each said pipe, a rear wall extending between the top and bottom walls and being in clamping engagement with one of said pipes in said plurality, a plurality of spaced apart claw walls extending from at least one of said top and bottom clamping walls and toward the other of said top and bottom clamping walls, with front openings being defined betweeen the respective front claw walls, said claw walls being disposed such that each said pipe extends through one of said openings and into said clamp member, and such that each said claw wall engages at least a selected one of the pipes, said clamp member further defining at least one open side, with the pipes extending through the open side, and an installation wall extending from a selected one of said top and bottom clamping walls, said installation wall comprising means for mounting the apparatus to the base, whereby the pipes are fixedly engaged in a concentrated manner by the top and bottom clamping walls, the rear wall and the claw walls.

* * * * *